US012668549B2

(12) United States Patent
Zhang et al.

(10) Patent No.: US 12,668,549 B2
(45) Date of Patent: Jun. 30, 2026

(54) GRADIENT STRUCTURE CUBIC BORON NITRIDE COMPOSITE SHEET AND PREPARATION METHOD THEREOF

(71) Applicants: CENTRAL SOUTH UNIVERSITY, Changsha (CN); SF DIAMOND CO., LTD., Zhengzhou (CN)

(72) Inventors: Shaohe Zhang, Changsha (CN); Yulu Li, Changsha (CN); Dongpeng Zhao, Zhengzhou (CN); Xiangwang Kong, Changsha (CN); Linglong Rong, Changsha (CN); Jincheng Li, Zhengzhou (CN); Hua Gao, Zhengzhou (CN); Dongyu Wu, Changsha (CN); Jingjing Wu, Changsha (CN); Leilei Liu, Changsha (CN); Pinghe Sun, Changsha (CN); Haijiang Fang, Zhengzhou (CN)

(73) Assignees: CENTRAL SOUTH UNIVERSITY, Changsha (CN); SF DIAMOND CO., LTD., Zhengzhou (CN)

( * ) Notice: Subject to any disclaimer, the term of this patent is extended or adjusted under 35 U.S.C. 154(b) by 423 days.

(21) Appl. No.: 18/401,725

(22) Filed: Jan. 2, 2024

(65) Prior Publication Data

US 2024/0228384 A1      Jul. 11, 2024

(30) Foreign Application Priority Data

Jan. 11, 2023   (CN) ......................... 202310039086.8

(51) Int. Cl.
*C04B 35/56*        (2006.01)
*B28B 1/00*         (2006.01)
(Continued)

(52) U.S. Cl.
CPC .......... *C04B 35/5626* (2013.01); *B28B 1/001* (2013.01); *B33Y 10/00* (2014.12); (Continued)

(58) Field of Classification Search
CPC ............ C04B 35/6342; C04B 35/5831; C04B 35/5626; B28B 1/001
See application file for complete search history.

(56) References Cited

U.S. PATENT DOCUMENTS

| | | | | |
|---|---|---|---|---|
| 8,636,946 B1 * | 1/2014 | Olver et al. | .......... | F27D 1/0006 |
| 8,814,434 B1 * | 8/2014 | Sexton et al. | ........ | F16C 33/043 |
| 2015/0367482 A1 * | 12/2015 | Zhu et al. | ............ | B24D 99/005 |

FOREIGN PATENT DOCUMENTS

| | | |
|---|---|---|
| CN | 105665697 | 6/2016 |
| CN | 113215428 | 8/2021 |
(Continued)

OTHER PUBLICATIONS

"Search Report of China Counterpart Application", issued on Apr. 28, 2025, p. 1-p. 2.

*Primary Examiner* — Benjamin L Utech
(74) *Attorney, Agent, or Firm* — JCIPRNET

(57)                    ABSTRACT

The disclosure provides a gradient structure cubic boron nitride composite sheet and a preparation method thereof. The gradient structure cubic boron nitride composite sheet consists of a cemented carbide substrate, a gradient transition layer, and a CBN layer from bottom to top. The gradient transition layer consists of N gradient layers, and the N is 4 to 18. From bottom to top, there are sequentially a first gradient layer, a second gradient layer, an Nth gradient layer, and so on. Any of the gradient layers consists of CBN and cemented carbide, in which the volume fraction of the cemented carbide in the Nth layer is 5 to 30% less than the volume fraction of the cemented carbide in the N−1th layer, (Continued)

and the volume fraction of the CBN in the Nth layer is 5 to 30% more than the volume fraction of the CBN in the N−1th layer.

10 Claims, 1 Drawing Sheet

(51) Int. Cl.
     B33Y 10/00          (2015.01)
     B33Y 70/10          (2020.01)
     C04B 35/5831     (2006.01)
     C04B 35/626      (2006.01)
     C04B 35/634      (2006.01)

(52) U.S. Cl.
     CPC .......... B33Y 70/10 (2020.01); C04B 35/5831 (2013.01); C04B 35/62695 (2013.01); C04B 35/6342 (2013.01); *C04B 2235/3847* (2013.01); *C04B 2235/386* (2013.01); *C04B 2235/6026* (2013.01); *C04B 2235/6562* (2013.01); *C04B 2235/6567* (2013.01); *C04B 2235/658* (2013.01); *C04B 2235/75* (2013.01)

(56)           References Cited

FOREIGN PATENT DOCUMENTS

| | | |
|---|---|---|
| CN | 113754445 | 12/2021 |
| CN | 114515833 | 5/2022 |

* cited by examiner

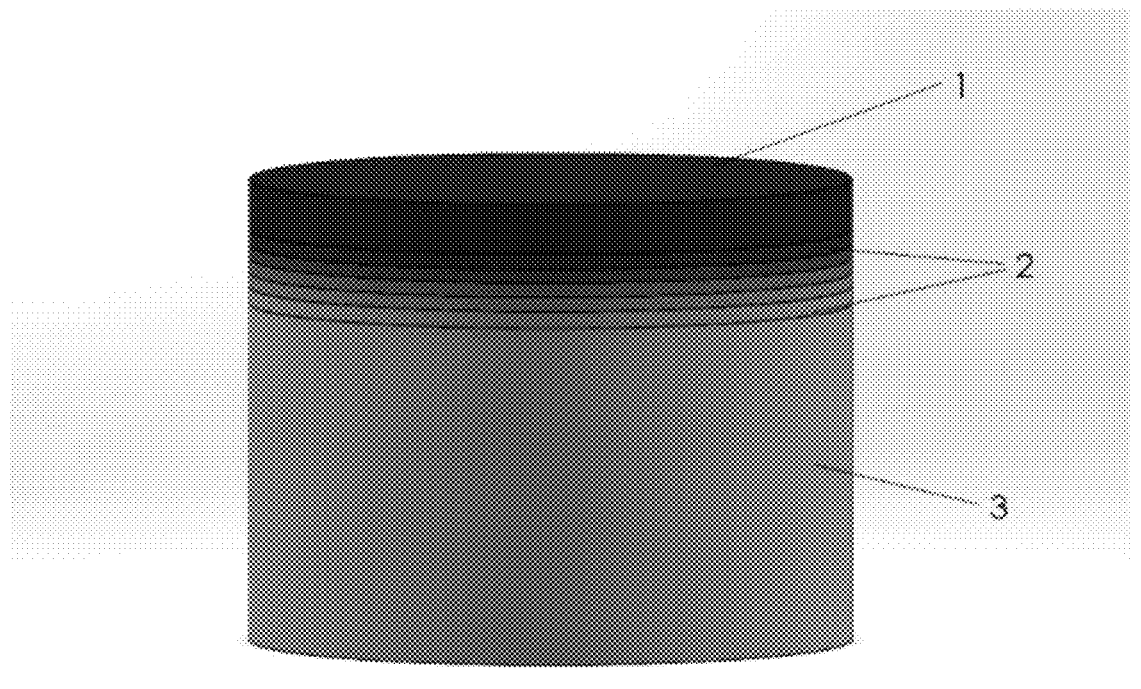

GRADIENT STRUCTURE CUBIC BORON NITRIDE COMPOSITE SHEET AND PREPARATION METHOD THEREOF

CROSS-REFERENCE TO RELATED APPLICATION

This application claims the priority benefit of China application serial no. 202310039086.8, filed on Jan. 11, 2023. The entirety of the above-mentioned patent application is hereby incorporated by reference herein and made a part of this specification.

BACKGROUND

Technical Field

The disclosure belongs to the technical field of superhard material preparation, and specifically relates to a gradient structure cubic boron nitride (CBN) composite sheet and a preparation method thereof.

Description of Related Art

The cubic boron nitride composite sheet has a high hardness, a high wear resistance, a low friction coefficient, and a good thermal stability, shows a high chemical inertness when processing iron-based materials, and are widely used in the processing of hard materials and ferrous metal materials. The conventional manufacturing process of the cubic boron nitride composite sheet is to sinter a CBN powder and a cemented carbide substrate at one time under a condition of a high temperature and a high pressure. Due to the difference in thermal expansion coefficient of the two materials, the thermal residual stress at the material interface during the cooling and pressure relief process is large. As a result, the CBN layer is prone to cracks during use, causing the CBN layer to shed, crack, chip, and gradually losing the cutting ability thereof and becoming invalid, thereby the service life of the cubic boron nitride composite sheet is reduced.

SUMMARY

In order to overcome the shortcomings of the existing technology, the first purpose of the disclosure is to provide a gradient structure cubic boron nitride composite sheet. Through disposing a gradient transition layer, the thermal residual stress of the cubic boron nitride composite sheet can be effectively reduced, the problems of the CBN layer shedding, cracking, and chipping when the cubic boron nitride composite sheet is working are solved, and the service life of the cubic boron nitride composite sheet is extended.

The second purpose of the disclosure is to provide a preparation method for the gradient structure cubic boron nitride composite sheet. Adopting a 3D printing manufacturing process can optimize the product performance, improve the production efficiency, and effectively control production costs.

In order to achieve the above purposes, the disclosure adopts technical solutions as the following.

A gradient structure cubic boron nitride composite sheet of the disclosure consists of a cemented carbide substrate, a gradient transition layer, and a CBN layer from bottom to top. The gradient transition layer consists of N layers of gradient layers, and the N is 4 to 18. From bottom to top, there are sequentially a first layer of the gradient layers, a second layer of the gradient layers, an Nth layer of the gradient layers, and so on. Any one layer of the gradient layers consists of CBN and cemented carbide, in which a volume fraction of the cemented carbide in the Nth layer is 5 to 30% less than a volume fraction of the cemented carbide in the N−1th layer, preferably the volume fraction of the cemented carbide in the Nth layer is 5 to 20% less than the volume fraction of the cemented carbide in the N−1th layer; and a volume fraction of the CBN in the Nth layer is 5 to 30% more than a volume fraction of the CBN in the N−1th layer, preferably the volume fraction of the CBN in the Nth layer is 5 to 20% more than the volume fraction of the CBN in the N−1th layer.

In the gradient structure cubic boron nitride composite sheet according to the disclosure, through disposing the gradient transition layer with 4 to 18 gradient layers, the coefficient of thermal expansion of the transition layer is between that of the CBN and the cemented carbide, thereby the difference between the coefficients of thermal expansion of the two materials can be reduced, the residual stress inside the composite sheet is reduced, and the performance thereof is greatly improved.

Certainly, the quantity of the transition layers have to be controlled within the scope of the disclosure. If the number of the transition layers is few, the transition from the cemented carbide to the CBN cannot be effectively realized. Also, neither the difference in physical and mechanical properties of the two materials can be reduced nor the purpose of alleviating the residual stress can be achieved. The greater the quantity of the gradient layers, the closer the composition distribution, the microstructure, and the mechanical property distribution thereof are to the ideal continuous gradient. However, too many layers result in the total thickness of the transition layer being too large. At the same time, since the current synthesis size of the composite sheet is limited, which causes the thickness of the cemented carbide substrate and the CBN layer to be reduced accordingly, thereby reducing the wear resistance and cutting efficiency of the composite sheet.

In addition, in the gradient layer, an unreasonable gradient in the raw material mass fraction between any two layers affects the residual stress at the interface thereof, thereby affecting the performance during use.

In a preferred solution, the cemented carbide in the cemented carbide substrate and the gradient layer is Co-WC, in which a mass fraction of Co is 3 to 30%, and a mass fraction of WC is 70 to 97%. In a more preferable solution, the mass fraction of Co is 10 to 15%, and the mass fraction of WC is 85 to 90%.

In a preferred solution, a total thickness of the gradient transition layer is 0.04 to 5 mm, and a thickness of any one of the gradient layers is 0.01 to 0.5 mm, preferably 0.05 to 0.25 mm. In a more preferable solution, the total thickness of the gradient transition layer is 0.2 to 4.5 mm.

A preparation method for the gradient structure cubic boron nitride composite sheets according to the disclosure includes the following. A CBN powder and a binder are mixed to obtain a CBN mixture. A CBN powder, a Co powder, a WC powder, and a binder are mixed according to designed components of each gradient layer to obtain N groups of gradient layer mixtures. The prepared CBN mixture and the N groups of gradient layer mixtures are respectively mixed, granulated, and drawn to obtain N+1 groups of filament materials. The N+1 groups of filament materials are printed with a 3D printer to obtain N+1 groups of green bodies. The N+1 groups of green bodies are assembled with the cemented carbide substrate to obtain a composite green body. The composite green body is degreased and synthesized under a high temperature and a high pressure to obtain the gradient structure cubic boron nitride composite sheet.

In a preferred solution, a particle size of the CBN powder is 1 to 100 μm, and a particle size of the Co powder and the WC powder is smaller than or equal to 100 μm. In a more preferable solution, the particle size of the CBN powder is 15 to 50 μm, and the particle size of the Co powder and the WC powder is 15 to 30 μm.

In a preferred solution, in the CBN mixture, a mass ratio of the CBN powder to the binder is 2 to 20:1. In a more preferable solution, the mass ratio of the CBN powder to the binder is 8 to 12:1.

In a preferred solution, in any one group of the gradient layer mixtures, a mass ratio of the total mass of the CBN powder, the Co powder, and the WC powder to the binder is 2 to 20:1. In a more preferable solution, the mass ratio of the total mass of the CBN powder, the Co powder, and the WC powder to the binder is 8 to 12:1.

In a preferred solution, a composition of the binder in the CBN mixture and the N groups of gradient layer mixtures is, in terms of a mass percentage, as follows: ethylene-vinyl acetate copolymer 20 to 70%, polystyrene 5 to 35%, polyurethane 5 to 35%, hydrogenated styrene-butadiene block copolymer 1 to 8%, dioctyl phthalate 1 to 7%, vinyl bis stearamide 1 to 6%, and stearic acid 1 to 6%.

The binder in the disclosure uses three types, ethylene-vinyl acetate copolymer, polystyrene, and polyurethane, as framework materials at the same time, in which ethylene-vinyl acetate copolymer introduces vinyl acetate monomer into the molecular chain, providing a good flexibility and filler compatibility thereof, which is the key material to ensure the flexibility of the filament material; polystyrene has a good fluidity and can promote the flow of materials when mixing to ensure the uniformity thereof; and polyurethane has both a high elasticity of rubber and a rigidity of plastic. The filament material needs to have not only a good flexibility but also a certain stiffness, so as to ensure that the filament material can be stably clamped and fed to the extrusion nozzle by the gears of the 3D printer. Therefore, the three framework materials complement each other. In addition, adopting the above three thermoplastic polymers as the framework materials at the same time, in the degreasing process, gradient degreasing temperatures are set according to different binder components to obtain a high degreasing rate and a relatively complete green body, which avoids the large-scale decomposition of a single binder to produce pores during degreasing, causing insufficient supporting force of the green body and resulting in degreasing defects such as cracks or collapse.

The binder in the disclosure uses ethylene-vinyl acetate copolymer, polystyrene, and polyurethane as main components, which can not only ensure that the filament material has a good fluidity property after being melted but also has a good solid phase wetting ability, thereby effectively wrapping powder particles to ensure the formed quality of the printing filament material. Dioctyl phthalate is a good plasticizer which can effectively improve the flexibility of the printing filament material, prevent the filament material from breaking during the printing process, and is also beneficial to the winding and collection of the printing filament material. Vinyl bis stearamide serves as a lubricant, which can improve the fluidity of materials during internal mixing and wire drawing. Stearic acid is a good dispersant, which can reduce the agglomeration of powder particles and ensure the uniformity of the internal material distribution of the printing filament material.

The inventors have found that it is crucial to control the composition of the binder within the scope of the disclosure, only when the composition formula of the binder is within the above range, the binder can be adapted to N+1 groups of different raw material powders, thereby ensuring that the prepared N+1 groups of printing filament materials have good flexibility, fluidity, and uniformity, so that a green body with uniform properties can be achieved by printing.

Further preferably, the composition of the binder in the CBN mixture and the N-group gradient layer mixture is as follows in terms of mass percentage: ethylene-vinyl acetate copolymer 40 to 55%, polystyrene 20 to 25%, polyurethane 15 to 25%, hydrogenated styrene-butadiene block copolymer 4 to 5%, dioctyl phthalate 1 to 2%, vinyl bis stearamide 2 to 3%, stearic acid 1 to 2%.

In a preferred solution, a mixing temperature is 100 to 300° C., and a drawing speed is 10 to 200 rpm. In a more preferable solution, the mixing temperature is 185 to 200° C., and the drawing speed is 35 to 50 rpm.

In a preferred solution, diameters of the N+1 groups of filament materials are all 1.65 mm to 1.85 mm.

In the disclosure, by first preparing N+1 groups of filament materials and then performing the fused deposition modeling (FDM), the uniformity of the material extruded from the nozzle can be fully ensured.

A preferred solution is that, during the 3D printing process, a printing speed is 10 to 300 mm/s, and a printing temperature is 100 to 350° C. In a more preferable solution, the printing speed is 25 to 45 mm/s, and the printing temperature is 220 to 230° C.

Further preferably, the 3D printing adopts a fused deposition modeling (FDM) printer.

In the actual operation process, first, printing parameters are set. The model of each structural layer of the gradient structure cubic boron nitride composite sheet is drawn on the computer, and the model is imported into a slicing software to set the printing parameters. Next, the model is imported into the FDM printer to implement printing. The filament materials are put into the printer in batches, and green bodies of each structural layer of the gradient structure cubic boron nitride composite sheet are printed out sequentially matching the corresponding printing model.

In a preferred solution, solvent degreasing is performed by first placing the composite green body in a cyclohexane solution and then thermal degreasing is performed in a vacuum environment.

Further preferably, a solvent degreasing temperature is 40° C. to 80° C., and a solvent degreasing time is 2 to 6 hours. In a more preferable solution, the solvent degreasing temperature is 60° C. to 70° C., and the solvent degreasing time is 4 to 6 hours.

Further preferably, a thermal degreasing process is as the following: first, raising a temperature from a room temperature to 80° C. to 120° C. at a temperature rise rate of 4 to 6° C./min and maintaining for 0.5 to 1 hour; next, raising the temperature to 200° C. to 270° C. at a temperature rise rate of 3 to 6° C./min and maintaining for 2 to 2.5 h; then, raising the temperature to 380° C. to 450° C. at a temperature rise rate of 2.5 to 4° C./min and maintaining for 1 to 2 h; and finally, raising the temperature to 580° C. to 620° C. at a temperature rise rate of 2 to 4° C./min and maintaining for 1.5 to 2 hours. In a more preferable solution, the thermal degreasing process is as the following: first, raising the temperature from the room temperature to 90° C. to 100° C. at the temperature rise rate of 4 to 6° C./min and maintaining for 0.5 to 1 hour; next, raising the temperature to 200° C. to 250° C. at the temperature rise rate of 4 to 6° C./min and maintaining for 2 to 2.5 h; then, raising the temperature to 400° C. to 450° C. at the temperature rise rate of 2.5 to 4° C./min and maintaining for 1 to 2 h; and finally, raising the temperature to 580° C. to 620° C. at the temperature rise rate of 2 to 4° C./min and maintaining for 1.5 to 2 hours.

In the thermal degreasing process of the disclosure, based on the difference in the pyrolysis temperature range of different components of the binder, the temperature is raised in a gradient manner for step-by-step degreasing, so as to ensure the integrity of the green body and the elimination of the binder in the green body, thereby defects of the degreasing is avoided.

In a preferred solution, a synthesis temperature of the degreased composite green body is 1400° C. to 2200° C., a synthesis pressure is 3 to 8 GPa, and a synthesis time is 120 s to 1000 s. In a more preferable solution, the synthesis temperature of the degreased composite green body is 1500° C. to 1800° C., the synthesis pressure is 5 to 8 GPa, and the synthesis time is 240 s to 400 s.

In the actual operation process, the degreased composite green body is put into a six-sided/four-sided/two-sided top press for synthesis. After the synthesis is completed, the pressure is slowly released and the temperature is reduced to obtain the gradient structure cubic boron nitride composite sheet.

Beneficial Effects

In the gradient structure cubic boron nitride composite sheet according to the disclosure, through disposing the gradient transition layer comprising 4 to 18 layers made of the two materials in different ratios between the cemented carbide and the CBN layer, the coefficient of thermal expansion of the transition layer is between the two materials' thermal expansion coefficient, thereby the difference between the coefficients of thermal expansion of the two materials can be reduced, the residual stress inside the composite sheet is reduced, and the bonding strength of the interface of the two materials is enhanced.

The disclosure adopts the fused deposition modeling (FDM) 3D printing process to manufacture the gradient structure cubic boron nitride composite sheet green bodies, which can accurately print the designed gradient structure transition layer and ensure the thickness requirements of the transition layer and the uniformity of the powder, thereby the performance of the polycrystalline cubic boron nitride composite sheet is optimized while the production efficiency is improved and the production cost is reduced.

BRIEF DESCRIPTION OF THE DRAWINGS

The FIGURE is a schematic diagram of a gradient structure cubic boron nitride composite sheet.

In the FIGURE, reference numeral 1 is a CBN layer, reference numeral 2 is a gradient transition layer, and reference numeral 3 is a cemented carbide layer.

DESCRIPTION OF THE EMBODIMENTS

In order to make the content of the disclosure more comprehensible, the disclosure is further described in detail below based on specific embodiments. In the following examples, the raw materials are commercially available unless otherwise specified. Among the raw materials, the ethylene-vinyl acetate copolymer has a molecular formula of $(C_2H_4)_x(C_4H_6O_2)_y$, and a melting point of 90~110° C.; the polystyrene has a molecular formula of $(C_8H_8)$ and a melting point of 212° C.; the polyurethane has a molecular formula of $(C_{10}H_8N_2O_2 \cdot C_6H_{14}O_3)_x$ and a melting point of 150~180° C.; the hydrogenated styrene-butadiene block copolymer has a molecular formula of $(C_8H_8 \cdot C_4H_6)_n$, and a melting point of 140~160° C.; the dioctyl phthalate has a molecular formula of $C_{24}H_{76}O_4$ and a melting point of −25° C.; the vinyl bis stearamide has a molecular formula of $C_{38}H_{76}N_2O_2$ and a melting point of about 141° C.; and the stearic acid has a molecular formula of $C_{18}H_{36}O_2$ and a melting point of 67~72° C.

Example 1

The raw materials used are a CBN powder and a cemented carbide powder, in which in the cemented carbide powder, the mass content of Co is 15%, and the mass content of WC is 85%. The particle size of the CBN powder is 15 μm, and the particle size of the cemented carbide powder is 18 μm. In the CBN layer and the transition layer, the mass ratios of the respective powders to a designated binder are all 8:1. The designated binder contains: 55% ethylene-vinyl acetate copolymer, 20% polystyrene, 15% polyurethane, 5% hydrogenated styrene-butadiene block copolymer, 1% dioctyl phthalate, 2% vinyl bis stearamide, and 2% stearic acid, calculated based on the mass percentage.

4 layers of composition gradient layer composed of the CBN powder and the cemented carbide are designed, in which the total layer thickness is 0.2 mm, the thickness of each layer is 0.05 mm, and as transitioned from the cemented carbide layer to the CBN layer, the volume content of the cemented carbide powder and the CBN powder in each layer is sequentially as the following, calculated based on a sum of the volume fraction of the cemented carbide powder and the CBN powder being 100%.

In the first layer, the content of the cemented carbide powder is 80%, and the content of the CBN powder is 20%.

In the second layer, the content of the cemented carbide powder is 60%, and the content of the CBN powder is 40%.

In the third layer, the content of the cemented carbide powder is 40%, and the content of the CBN powder is 60%.

In the fourth layer, the content of the cemented carbide powder is 20%, and the content of the CBN powder is 80%.

The embodiment provides a 3D printing manufacturing process for a gradient structure cubic boron nitride composite sheet, which includes the following steps.

1) Mixing: the raw materials are mixed according to the gradient requirements to prepare the mixture required corresponding to the CBN layer and the transition layer.

2) Wire drawing: respective kinds of mixtures are put into the internal mixer sequentially to knead and granulate, and then the granular materials are put into the wire drawing machine to obtain filament materials with a diameter of 1.75 mm, in which the internal mixing temperature is 185° C., and the speed of the wire drawing machine is 35 rpm.

3) Model and parameter designing: the model of each structural layer of the gradient structure cubic boron nitride composite sheet is imported into a slicing software to set the printing parameters and then imported into the FDM printer, in which the printing speed is 30 mm/s, the print thickness of the transition layer (the thickness of single transition layer) is 0.05 mm, the print thickness of the remaining layer (the thickness of CBN layer) is 0.4 mm, and the printing temperature is 230° C.

4) Printing: the filament materials are put into the printer in batches, and the green body of each structural layer of the gradient structure cubic boron nitride composite sheet are printed out sequentially matching the corresponding printing model.

5) Degreasing: after being assembled, the obtained green body is put into a cyclohexane solution, maintained at 60° C. for 4 hours and then put into a vacuum degreasing furnace to perform thermal degreasing. First, the temperature is raised from the room temperature to 100° C. at 5° C./min and maintained at 100° C. for 0.5 hour. Next, the temperature is raised from 100° C. to 250° C. at 4° C./min and maintained at 250° C. for 2 hours. Then, the temperature is raised from 250° C. to 400° C. at 4° C./min and maintained at 400° C. for 1.5 hour. Finally, the temperature is raised from 400° C. to 600° C. at 2° C./min and maintained at 600° C. for 1.5 hours.

6) High temperature and high pressure synthesis: the degreased parts and the cemented carbide substrate are placed into the mold and put into a six-sided top press for sintering, in which the temperature is 1500° C., the pressure is 5 GPa, and the sintering time is 240 s. After the sintering is completed, the pressure is slowly released and the temperature is reduced to obtain the gradient structure cubic boron nitride composite sheet.

The cubic boron nitride composite sheet prepared by the above process has a residual stress value of 489 GPa and an impact toughness of 5.32 KJ.

Example 2

The raw materials used are a CBN powder and a cemented carbide powder, in which in the cemented carbide powder, the mass content of Co is 10%, and the mass content of WC is 90%. The particle size of the CBN powder is 30 μm, and the particle size of the cemented carbide powder is 15 μm. In the CBN layer and the transition layer, the mass ratios of the respective powders to a designated binder are all 10:1. The designated binder contains: 50% ethylene-vinyl acetate copolymer, 25% polystyrene, 15% polyurethane, 5% hydrogenated styrene-butadiene block copolymer, 2% dioctyl phthalate, 2% vinyl bis stearamide, and 1% stearic acid, calculated based on the mass percentage.

8 layers of composition gradient layer composed of the CBN powder and the cemented carbide are designed, in which the total layer thickness is 2 mm, the thickness of each layer is 0.25 mm, and as transitioned from the cemented carbide layer to the CBN layer, the volume content of the cemented carbide powder and the CBN powder in each layer is sequentially as the following, calculated based on a sum of the volume fraction of the cemented carbide powder and the CBN powder being 100%.

In the first layer, the content of the cemented carbide powder is 95%, and the content of the CBN powder is 5%.

In the second layer, the content of the cemented carbide powder is 90%, and the content of the CBN powder is 10%.

In the third layer, the content of the cemented carbide powder is 80%, and the content of the CBN powder is 20%.

In the fourth layer, the content of the cemented carbide powder is 70%, and the content of the CBN powder is 30%.

In the fifth layer, the content of the cemented carbide powder is 60%, and the content of the CBN powder is 40%.

In the sixth layer, the content of the cemented carbide powder is 40%, and the content of the CBN powder is 60%.

In the seventh layer, the content of the cemented carbide powder is 30%, and the content of the CBN powder is 70%.

In the eighth layer, the content of the cemented carbide powder is 20%, and the content of the CBN powder is 80%.

The embodiment provides a 3D printing manufacturing process for a gradient structure cubic boron nitride composite sheet, which includes the following steps.

1) Mixing: the raw materials are mixed according to the gradient requirements to prepare the mixture required corresponding to the CBN layer and the transition layer.

2) Wire drawing: respective kinds of mixtures are put into the internal mixer sequentially to knead and granulate, and then the granular materials are put into the wire drawing machine to obtain filament materials with a diameter of 1.75 mm, in which the internal mixing temperature is 190° C., and the speed of the wire drawing machine is 50 rpm.

3) Model and parameter designing: the model of each structural layer of the gradient structure cubic boron nitride composite sheet is imported into a slicing software to set the printing parameters and then imported into the FDM printer, in which the printing speed is 25 mm/s, the print thickness of the transition layer (the thickness of single transition layer) is 0.25 mm, the print thickness of the remaining layer (the thickness of CBN layer) is 0.4 mm, and the printing temperature is 220° C.

4) Printing: the filament materials are put into the printer in batches, and the green body of each structural layer of the gradient structure cubic boron nitride composite sheet are printed out sequentially matching the corresponding printing model.

5) Degreasing: after being assembled, the obtained green body is put into a cyclohexane solution, maintained at 70° C. for 6 hours and then put into a vacuum degreasing furnace to perform thermal degreasing. First, the temperature is raised from the room temperature to 100° C. at 6° C./min and maintained at 100° C. for 0.5 hour. Next, the temperature is raised from 100° C. to 250° C. at 4° C./min and maintained at 250° C. for 2 hours. Then, the temperature is raised from 250° C. to 400° C. at 4° C./min and maintained at 400° C. for 1 hour. Finally, the temperature is raised from 400° C. to 600° C. at 2° C./min and maintained at 600° C. for 2 hours.

6) High temperature and high pressure synthesis: the degreased parts are placed into the mold and put into a six-sided top press for sintering, in which the temperature is 1800° C., the pressure is 7 GPa, and the sintering time is 360 s. After the sintering is completed, the pressure is slowly released and the temperature is reduced to obtain the gradient structure cubic boron nitride composite sheet.

The cubic boron nitride composite sheet prepared by the above process has a residual stress value of 312 GPa and an impact toughness of 7.45 KJ.

Example 3

The raw materials used are a CBN powder and a cemented carbide powder, in which in the cemented carbide powder, the mass content of Co is 13%, and the mass content of WC is 87%. The particle size of the CBN powder is 50 μm, and the particle size of the cemented carbide powder is 30 μm.

In the CBN layer and transition layer, the mass ratios of the respective powders to a designated binder are all 12:1. The designated binder contains: 40% ethylene-vinyl acetate copolymer, 25% polystyrene, 25% polyurethane, 4% hydrogenated styrene-butadiene block copolymer, 1% dioctyl phthalate, 3% vinyl bis stearamide, and 2% stearic acid, calculated based on the mass percentage.

18 layers of composition gradient layer composed of the CBN powder and the cemented carbide are designed, in which the total layer thickness is 4.5 mm, the thickness of each layer is 0.25 mm, and as transitioned from the cemented carbide layer to the CBN layer, the volume content of the cemented carbide powder and the CBN powder in each layer is sequentially as the following, calculated based on a sum of the volume fraction of the cemented carbide powder and the CBN powder being 100%.

In the first layer, the content of the cemented carbide powder is 95%, and the content of the CBN powder is 5%.

In the second layer, the content of the cemented carbide powder is 90%, and the content of the CBN powder is 10%.

In the third layer, the content of the cemented carbide powder is 85%, and the content of the CBN powder is 15%.

In the fourth layer, the content of the cemented carbide powder is 80%, and the content of the CBN powder is 20%.

In the fifth layer, the content of the cemented carbide powder is 75%, and the content of the CBN powder is 25%.

In the sixth layer, the content of the cemented carbide powder is 70%, and the content of the CBN powder is 30%.

In the seventh layer, the content of the cemented carbide powder is 65%, and the content of the CBN powder is 35%.

In the eighth layer, the content of the cemented carbide powder is 60%, and the content of the CBN powder is 40%.

In the ninth layer, the content of the cemented carbide powder is 55%, and the content of the CBN powder is 45%.

In the tenth layer, the content of the cemented carbide powder is 50%, and the content of the CBN powder is 50%.

In the eleventh layer, the content of the cemented carbide powder is 45%, and the content of the CBN powder is 55%.

In the twelfth layer, the content of the cemented carbide powder is 40%, and the content of the CBN powder is 60%.

In the thirteenth layer, the content of the cemented carbide powder is 35%, and the content of the CBN powder is 65%.

In the fourteenth layer, the content of the cemented carbide powder is 30%, and the content of the CBN powder is 70%.

In the fifteenth layer, the content of the cemented carbide powder is 25%, and the content of the CBN powder is 75%.

In the sixteenth layer, the content of the cemented carbide powder is 20%, and the content of the CBN powder is 80%.

In the seventeenth layer, the content of the cemented carbide powder is 15%, and the content of the CBN powder is 85%.

In the eighteenth layer, the content of the cemented carbide powder is 10%, and the content of the CBN powder is 90%.

The embodiment provides a 3D printing manufacturing process for a gradient structure cubic boron nitride composite sheet, which includes the following steps.

1) Mixing: the raw materials are mixed according to the gradient requirements to prepare the mixture required corresponding to the CBN layer and the transition layer.

2) Wire drawing: respective kinds of mixtures are put into the internal mixer sequentially to knead and granulate, and then the granular materials are put into the wire drawing machine to obtain filament materials with a diameter of 1.75 mm, in which the internal mixing temperature is 200° C., and the speed of the wire drawing machine is 45 rpm.

3) Model and parameter designing: the model of each structural layer of the gradient structure cubic boron nitride composite sheet is imported into a slicing software to set the printing parameters and then imported into the FDM printer, in which the printing speed is 45 mm/s, the print thickness of the transition layer is 0.25 mm, the print thickness of the remaining layer is 0.4 mm, and the printing temperature is 220° C.

4) Printing: the filament materials are put into the printer in batches, and the green body of each structural layer of the gradient structure cubic boron nitride composite sheet are printed out sequentially matching the corresponding printing model.

5) Degreasing: after being assembled, the obtained green body is put into a cyclohexane solution, maintained at 60° C. for 5 hours and then put into a vacuum degreasing furnace to perform thermal degreasing. First, the temperature is raised from the room temperature to 90° C. at 4° C./min and maintained at 90° C. for 1 hour. Next, the temperature is raised from 90° C. to 200° C. at 6° C./min and maintained at 200° C. for 2.5 hours. Then, the temperature is raised from 200° C. to 450° C. at 4° C./min and maintained at 450° C. for 2 hours. Finally, the temperature is raised from 450° C. to 600° C. at 4° C./min and maintained at 600° C. for 1.5 hours.

6) High temperature and high pressure synthesis: the degreased parts are placed into the mold and put into a six-sided top press for sintering, in which the temperature is 1700° C., the pressure is 8 GPa, and the sintering time is 400 s. After the sintering is completed, the pressure is slowly released and the temperature is reduced to obtain the gradient structure cubic boron nitride composite sheet.

The cubic boron nitride composite sheet prepared by the above process has a residual stress value of 215 GPa and an impact toughness of 8.85 KJ.

Comparative Example 1

With other conditions being the same as in Example 1, merely one gradient transition layer containing 50% of CBN and 50% of cemented carbide is designed, wherein a thickness of the gradient transition layer and the total thickness of the transition layer in Example 1 are the same. However, due to the small quantity of the gradient layers, it is unable to effectively transition from the cemented carbide layer to the CBN layer. By testing the residual stress of the cubic boron nitride composite sheet prepared in Example 1 and the composite sheet in this Comparative Example 1 under the same working conditions, it is found that the residual stress value of the composite sheet prepared in Comparative Example 1 is 659 GPa, which is significantly greater than the cubic boron nitride composite sheet prepared in Example 1. Moreover, under the same drilling conditions, the cubic boron nitride layer of the composite sheet in this Comparative Example 1 is more likely to shed and be scrapped.

Comparative Example 2

With other conditions being the same as in Example 2, except that the formula for the binder is: 10% ethylene-vinyl acetate copolymer, 15% polystyrene, 15% polyurethane, 30% hydrogenated styrene-butadiene block copolymer, 10% dioctyl phthalate, 10% vinyl bis stearamide, and 10% stearic acid. Since the content of ethylene-vinyl acetate copolymer in the binder is low and the content of other additives is high, the mixture becomes a sparse solid-liquid mixture during the internal mixing process and cannot be extruded through a wire drawing machine to obtain usable printing filament material.

Comparative Example 3

With other conditions being the same as in Example 3, except that the temperature is raised to the temperature to 600° C. at the temperature rise rate of 10° C./min and maintained at 600° C. during the thermal degreasing process, rather than raised in a gradient manner. However, due to the temperature rise rate being fast, the volatilization rate of the binder is fast, causing a large amount of gas to accumulate in the green body, and the increase in air pressure causes defects such as bubbling or cracking in the green body. When the degreased green body with defects is synthesized, the surface of the obtained cubic boron nitride composite sheet has significant cracks and the material distribution is ununiform.

The above descriptions are only preferred embodiments of the present invention, and are not intended to limit the present invention. For those skilled in the art, the present invention may have various modifications and changes. Any modification, equivalent replacement, improvement, etc. made within the spirit and principle of the present invention shall be included within the protection scope of the present invention.

What is claimed is:

1. A gradient structure cubic boron nitride composite sheet, consisting of a cemented carbide substrate, a gradient transition layer, and a CBN layer from bottom to top, wherein the gradient transition layer consists of N layers of gradient layers, the N is 4 to 18, there are sequentially a first layer of the gradient layers, a second layer of the gradient layers, and Nth layer of the gradient layers from bottom to top, any one layer of the gradient layers consists of CBN and cemented carbide, a volume fraction of the cemented carbide in the Nth layer is 5 to 30% less than a volume fraction of the cemented carbide in the N−1th layer, and a volume fraction of the CBN in the Nth layer is 5 to 30% more than a volume fraction of the CBN in the N−1th layer.

2. The gradient structure cubic boron nitride composite sheet as claimed in claim 1, wherein the cemented carbide in the cemented carbide substrate and the gradient layer is Co-WC, a mass fraction of Co is 3 to 30%, and a mass fraction of WC is 70 to 97%.

3. The gradient structure cubic boron nitride composite sheet as claimed in claim 1, wherein a total thickness of the gradient transition layer is 0.04 to 5 mm, and a thickness of any one of the gradient layers is 0.01 to 0.5 mm.

4. A preparation method of the gradient structure cubic boron nitride composite sheet as claimed in claim 1, comprising:

mixing a CBN powder and a binder to obtain a CBN mixture;

mixing a CBN powder, a Co powder, a WC powder, and a binder according to designed components of each of the gradient layers to obtain N groups of gradient layer mixtures;

mixing, granulating, and drawing respectively on the prepared CBN mixture and the N groups of gradient layer mixtures to obtain N+1 groups of filament materials;

printing the N+1 groups of filament materials with a 3D printer to obtain N+1 groups of green bodies;

assembling the N+1 groups of green bodies with the cemented carbide substrate to obtain a composite green body; and performing degreasing and synthesis under a high temperature and a high pressure on the composite green body to obtain the gradient structure cubic boron nitride composite sheet.

5. The preparation method of the gradient structure cubic boron nitride composite sheet as claimed in claim 4, wherein a particle size of the CBN powder is 1 to 100 μm, and a particle size of the Co powder and the WC powder is smaller than or equal to 100 μm;

in the CBN mixture, a mass ratio of the CBN powder to the binder is 2 to 20:1;

in any one group of the gradient layer mixtures, a mass ratio of a total mass of the CBN powder, the Co powder, and the WC powder to the binder is 2 to 20:1.

6. The preparation method of the gradient structure cubic boron nitride composite sheet as claimed in claim 4, wherein a composition of the binder in the CBN mixture and the N groups of gradient layer mixtures is, in terms of a mass percentage, as follows: ethylene-vinyl acetate copolymer 20 to 70%, polystyrene 5 to 35%, polyurethane 5 to 35%, hydrogenated styrene-butadiene block copolymer 1 to 8%, dioctyl phthalate 1 to 7%, vinyl bis stearamide 1 to 6%, and stearic acid 1 to 6%.

7. The preparation method of the gradient structure cubic boron nitride composite sheet as claimed in claim 4, wherein a mixing temperature is 100 to 300° C., and a drawing speed is 10 rpm to 200 rpm; and diameters of the N+1 group of filament materials are all 1.65 mm to 1.85 mm.

8. The preparation method of the gradient structure cubic boron nitride composite sheet as claimed in claim 4, wherein during the 3D printing process, a printing speed is 10 to 300 mm/s, and a printing temperature is 100 to 350° C.

9. The preparation method of the gradient structure cubic boron nitride composite sheet as claimed in claim 4, comprising:

performing solvent degreasing by first placing the composite green body in a cyclohexane solution and then performing thermal degreasing in a vacuum environment; wherein a solvent degreasing temperature is 40° C. to 80° C., and a solvent degreasing time is 2 to 6 hours; and a thermal degreasing process is as the following: first, raising a temperature from a room temperature to 80° C. to 120° C. at a temperature rise rate of 4 to 6° C./min and maintaining for 0.5 to 1 hour; next, raising the temperature to 200° C. to 270° C. at a temperature rise rate of 3 to 6° C./min and maintaining for 2 to 2.5 h; then, raising the temperature to 380° C. to 450° C. at a temperature rise rate of 2.5 to 4° C./min and maintaining for 1 to 2 h; and finally, raising the temperature to 580° C. to 620° C. at a temperature rise rate of 2 to 4° C./min and maintaining for 1.5 to 2 hours.

10. The preparation method of the gradient structure cubic boron nitride composite sheet as claimed in claim 4, wherein:

a synthesis temperature of the degreased composite green body is 1400° C. to 2200° C., a synthesis pressure is 3 to 8 GPa, and a synthesis time is 120 s to 1000 s.

* * * * *